Nov. 10, 1959  E. C. KIEKHAEFER  2,911,967

INTAKE MANIFOLD

Filed Sept. 20, 1956  2 Sheets-Sheet 1

INVENTOR.
ELMER C. KIEKHAEFER
BY
Andrus & Sceales
Attorneys

Nov. 10, 1959  E. C. KIEKHAEFER  2,911,967
INTAKE MANIFOLD
Filed Sept. 20, 1956  2 Sheets-Sheet 2
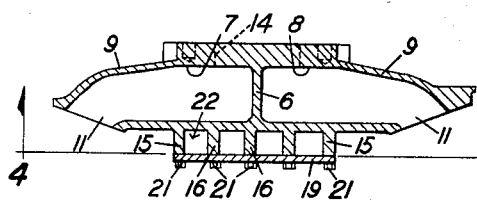
Fig. 3
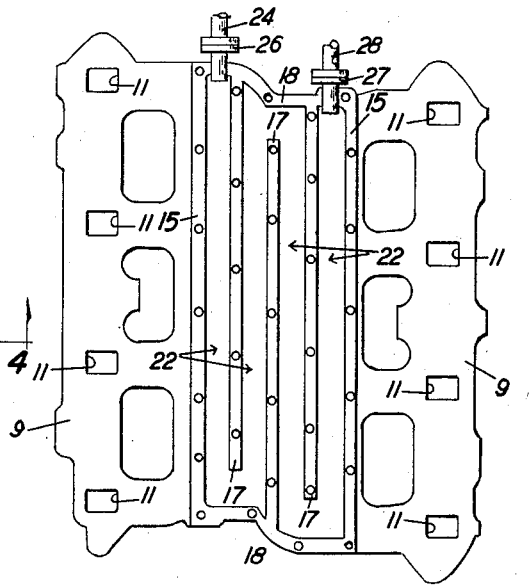
Fig. 4
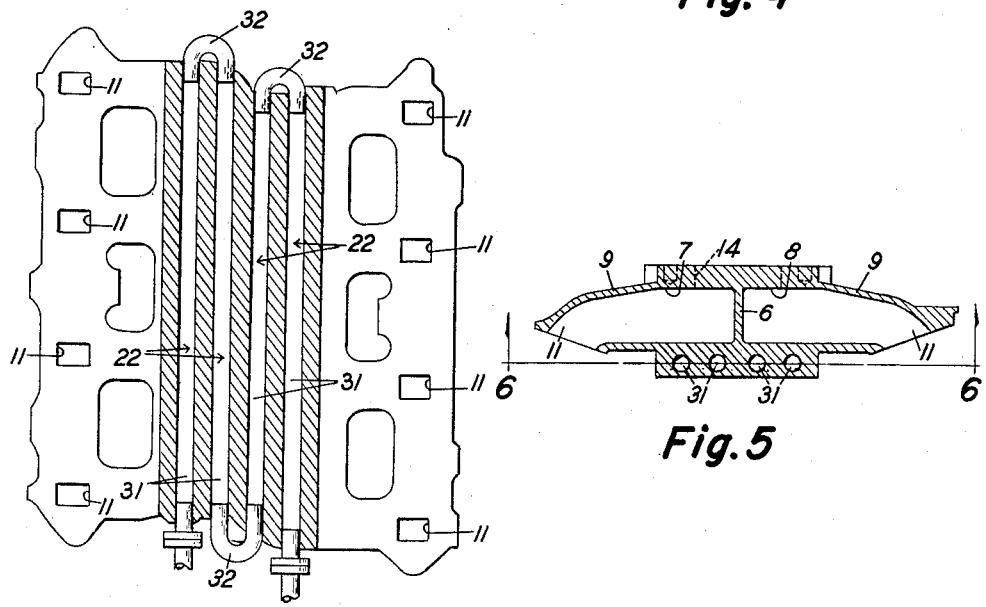
Fig. 5
Fig. 6
INVENTOR.
ELMER C. KIEKHAEFER
BY
Andrus & Sceales
Attorneys

United States Patent Office 2,911,967
Patented Nov. 10, 1959

2,911,967
INTAKE MANIFOLD
Elmer C. Kiekhaefer, Cedarburg, Wis.

Application September 20, 1956, Serial No. 610,946

2 Claims. (Cl. 123—122)

This invention relates generally to internal combustion engines and more specifically to an improved intake manifold for an internal combustion engine.

In the operation of an internal combustion engine, the reduced cylinder pressures developed by the downwardly moving pistons induce a fuel mixture to be drawn through the carburetor, intake manifold and intake valves into the cylinders. The vaporized fuel mixture passing through the air intake manifold absorbs heat from the intake manifold cooling the surfaces thereof. Under continued operation, the air intake surfaces become cooled to a temperature sufficiently low to cause the warmer vaporized fuel mixture coming into contact therewith while passing therethrough to form condensation resulting in a lower volumetric efficiency and less efficient engine operation. Furthermore, under steady and continuous engine operation, the lubricant or oil within the oil reservoir used to lubricate the engine parts becomes heated thereby reducing the efficiency of the lubricant. Applicant presents an improved intake manifold that eliminates the aforementioned objectionable conditions and improves the engine operating efficiency.

It is therefore an object of the present invention to provide an improved intake manifold for an internal combustion engine that will prevent the condensation of the fuel mixture passing therethrough.

Another object of the invention is to provide an improved intake manifold for cooling the engine lubricant.

A more specific object of the invention is the provision of an improved intake manifold operating as a heat exchanger to cool the engine lubricant and heat the air intake manifold.

Objects and advantages other than those set forth above will be apparent from the following description when read in connection with the accompanying drawing, in which:

Fig. 3 is a view taken along line 3—3 of Fig. 2;

Fig. 4 is a view taken along the line 4—4 of Fig. 3;

Fig. 5 is a view similar to Fig. 3 showing another embodiment of the invention; and Fig. 6 is a view taken along line 6—6 of Fig. 5.

Figure 1:
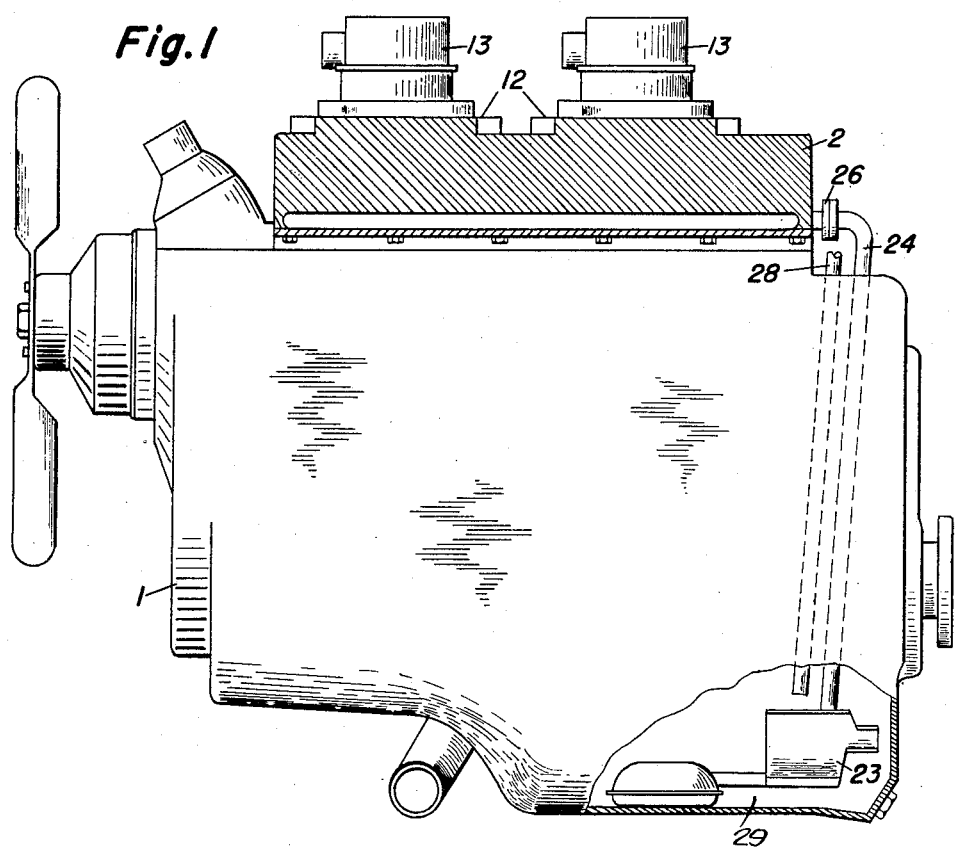
Fig. 1 is a side elevation view partly in section of an internal combustion engine embodying the invention.
Figure 2:
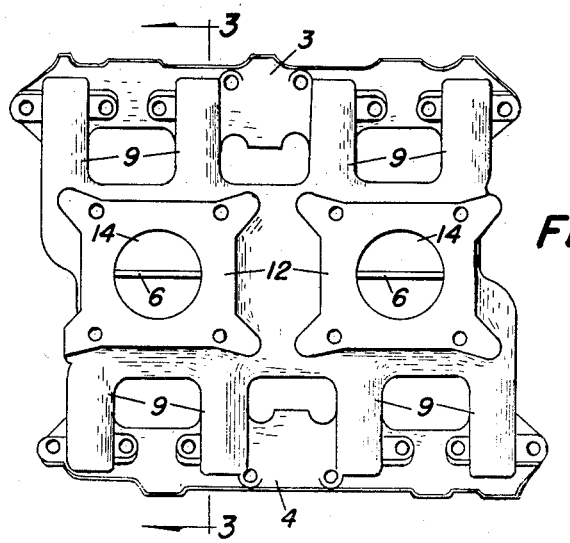
Fig. 2 is a plan view of the manifold structure of Fig. 1.

As shown in the drawings, this invention is illustrated as applied to an internal combustion engine 1 having an intake manifold 2. The intake manifold 2 comprises two sections 3, 4 having a common vertically extending parting wall 6. Each section 3, 4 has a cavity 7, 8 respectively and is further provided with a plurality of branches 9 each forming a fuel mixture passage 11 connecting one of the cavities to each of the engine cylinders with the number of passages equal to the number of engine cylinders to be provided with the fuel mixture. In the illustrated embodiment, the engine 1 is an eight-cylinder V-8 and consequently each section 3, 4 has four branches 9 and four passages 11 connected to each of the cavities. The upper walls of the sections 3, 4 form seats 12 to accommodate a pair of carburetors 13, and further form central openings 14 in the seats in register with the carburetor inlets. The lower walls of the sections 3, 4 are provided with a pair of spaced parallel outer flanges 15 connected at the ends by ribs 18, and are further provided with a plurality of laterally spaced fins 16 parallel to the flanges 15. Each fin 16 has one end connected to one of the ribs 18 and the other end 17 spaced from the other rib 18, and are disposed so that adjacent fins 16 do not have their ends 17 spaced from the same rib 18 of the manifold 2 as shown in Fig. 4. A flat, substantially rectangular cover plate 19 is secured to the flange 15, fins 16 and ribs 18 by a plurality of bolts 21. An oil seal, not shown, is normally interposed between the plate 19 and the flanges 15, fins 16 and ribs 18 of the manifold 2. The lower walls of sections 3, 4, the flanges 15, the fins 16, the ribs 18 and the cover plate 19 combine to form a heat exchanger having a circuitous zigzag passageway 22. Engine lubricant is supplied to the passageway 22 by means of an oil pump 23 and conduit 24 having one end connected to an inlet fitting 26 carried by one of the ribs 18. The lubricant leaves the manifold 2 through an outlet fitting 27 carried by the rib 18 connected to a conduit 28 emptying into an oil reservoir 29.

In the embodiment of the invention illustrated in Figs. 5 and 6, a plurality of laterally spaced passages 31 are cast into the lower walls of the sections 3, 4. The ends of the passages 31 are connected together by means of U-shaped tubular elements 32 having ends forcibly inserted within the ends of the passages 31 to form a continuous zigzag passageway 22 for the lubricant.

In the operation of applicant's invention, the heated lubricant is pumped through the passageway 22 of the intake manifold 2 where a heat exchange takes place resulting in an increase in the temperature of the manifold surfaces thereby reducing fuel mixture condensation, and a decrease in the temperature of the lubricant resulting in a more efficient and longer lasting lubricant.

Although only two embodiments have been illustrated and described, it will be apparent to those skilled in the art that various changes and modifications may be made therein without departing from the spirit of the invention or from the scope of the appended claims.

Various modes of carrying out the invention are contemplated as being within the scope of the following claims particularly pointing out and distinctly claiming the subject matter which is regarded as the invention.

I claim:

1. In an engine, the combination of: carburetting means; an intake manifold connecting said carburetting means to the engine cylinders; a pair of spaced apart external flanges provided in a wall of said intake manifold, said flanges being connected at their ends by ribs; a plurality of laterally spaced fins provided by said intake manifold positioned between and spaced from said flanges, each of said fins having one end connected to one of said ribs and the opposite end spaced from the other of said ribs, said fins further being disposed so that adjacent fins do not have their said opposite ends spaced from the same ribs; a cover secured to said flanges, said ribs and said fins to form therewith a zigzag passageway; a pump; means connecting the outlet of said pump to the inlet of said passageway; and means connecting the outlet of said passageway to the inlet of said pump.

2. In an engine, the combination of: carburetting means; an intake manifold connecting said carburetting means to the engine cylinders and having opposed walls with one of said walls being adapted to receive the carburetting means; a pair of spaced apart flanges provided on the wall of said intake manifold opposite from the carburetting means, said flanges being connected at their ends by ribs; a plurality of laterally spaced fins provided on the wall of said intake manifold positioned between and spaced from said flanges, each of said fins having one end connected to one of said ribs and the opposite end spaced from the other of said ribs, said fins further being disposed so that adjacent fins do not have their said opposite ends spaced from the same rib; a cover secured to said flanges, said ribs and said fins to form therewith a zigzag passageway; an oil pump disposed in a reservoir; a conduit connecting the outlet of said pump to the inlet of said passageway; and conduit means connecting the outlet of said passageway to said reservoir.

References Cited in the file of this patent

UNITED STATES PATENTS

| | | |
|---|---|---|
| 1,078,919 | Hall | Nov. 18, 1913 |
| 1,248,417 | Masury | Nov. 27, 1917 |
| 1,260,388 | Johnson | Mar. 26, 1918 |
| 1,344,793 | Dasey | June 29, 1920 |
| 1,862,723 | Summers | June 14, 1932 |
| 2,324,592 | Olson | July 20, 1943 |

FOREIGN PATENTS

| | | |
|---|---|---|
| 658,535 | Germany | Apr. 5, 1938 |